(12) United States Patent
Aitken

(10) Patent No.: US 7,767,604 B2
(45) Date of Patent: Aug. 3, 2010

(54) GA—P—S GLASS COMPOSITIONS

(75) Inventor: Bruce Gardiner Aitken, Corning, NY (US)

(73) Assignee: Corning Incorporated, Corning, NY (US)

( * ) Notice: Subject to any disclaimer, the term of this patent is extended or adjusted under 35 U.S.C. 154(b) by 352 days.

(21) Appl. No.: 12/111,620

(22) Filed: Apr. 29, 2008

(65) Prior Publication Data

US 2009/0270241 A1 Oct. 29, 2009

(51) Int. Cl.
*C03C 3/32* (2006.01)

(52) U.S. Cl. .......................... 501/40; 385/147

(58) Field of Classification Search .................. 501/40; 385/147
See application file for complete search history.

(56) References Cited

U.S. PATENT DOCUMENTS

| | | | |
|---|---|---|---|
| 5,389,584 A | 2/1995 | Aitken et al. | 3/32 |
| 6,277,775 B1 | 8/2001 | Aitken | 3/32 |
| 6,696,157 B1 | 2/2004 | David et al. | 9/0 |
| 7,184,203 B2 | 2/2007 | Burgener, II et al. | 2/2 |
| 7,330,634 B2 | 2/2008 | Aitken et al. | 6/0 |
| 2003/0064293 A1 | 4/2003 | Elliott et al. | 430/1 |

OTHER PUBLICATIONS

Randall E. Youngman, et al., *Structure and properties of GeGaP sulphide glasses*, Journal of Non-Crystalline Solids, vols. 345 & 346, pp. 50-55 (2004).

Gong Yuequi, et al., *Second Harmonic Generation of New Kind of Chalcogenide Glasses Induced by Thermal-Electric Poling*, vol. 34, No. 7, pp. 831-835 (2006).

Bruce G. Aitken, et al., *Structure of Ga-containing thiophosphate glasses: evidence from NMR, Raman and optical spectroscopy*, $19^{th}$ International Congress on Glass Soc. Glass Technol Sheffield, UK, vol. 2., pp. 387, Abstract.

Santagneli, Silvia H., et al. *Preparation and Characterization of New Glassy System $As_2P_2S_8$–$Ga_2S_3$*, J. Phys. Chem. B 2008, 112, pp. 4943-4947.

Koudelka et al., "Vibrational spectra and structure of As—P—S glasses", Journal of Non-Crystalline Solids 134 (1991), pp. 86-93.

Tverjanovich et al., "A glass-forming system with compound-forming tendency; $As_4S_6$—$P_4S_{10}$", Journal of Non-Crystalline Solids 130 (1991), pp. 236-242.

*Primary Examiner*—Karl E Group
*Assistant Examiner*—Elizabeth A Bolden
(74) *Attorney, Agent, or Firm*—Tina N. Thompson

(57) ABSTRACT

Ga—P—S glass compositions that may have application in infrared (IR) windows, waveguiding fibers, or as host glasses for luminescent dopants are described.

22 Claims, 2 Drawing Sheets

Ga—P—S GLASS COMPOSITIONS

BACKGROUND

1. Field

Embodiments of the invention relate to Ga—P—S glass compositions. The glass compositions may transmit infrared radiation. Infrared-transmitting glasses have application in, for example, infrared (IR) windows, waveguiding fibers, and as host glasses for luminescent dopants, for example, rare earth dopants.

2. Technical Background

Infrared radiation is the portion of the electromagnetic spectrum just below red light in terms of frequency. Infrared-transmitting materials have many applications. For example, in the field of astronomy, the earth's atmosphere does not scatter infrared radiation as much as visible light. Thus, special filters that block all but infrared rays can be used to obtain precise astronomical images without the scattering associated with visible light. Transmitted infrared radiation can also be used, for example, in detecting the positions of objects or people in the absence of visible light. This property has been used in military applications, for example, in infrared sensors.

Infrared-transmitting glasses, such as those disclosed in commonly owned U.S. Pat. No. 5,240,885, transmit radiation well into the infrared portion of the electromagnetic radiation spectrum due to their low phonon energy. These glasses can be used, for example, for the fabrication of efficient lasers, amplifiers, and up converters when doped with the appropriate rare earth dopants.

Since metal-sulfur bonds are generally weaker than metal-oxygen bonds, sulfide glasses exhibit lower phonon energies than oxide glasses and, therefore, transmit radiation further into the infrared region of the electromagnetic radiation spectrum. Accordingly, sulfide glasses may have the potential of being host materials for rare earth metals for applications such as those described for the glasses of U.S. Pat. No. 5,240,885.

However, many sulfide glasses are dark in color and, consequently, may not be suited for some of the above applications inasmuch as such a host glass, rather than the rare earth element, would tend to absorb the radiation.

One exemplary sulfide glass, arsenic sulfide, is transparent to radiation in the long wavelength range of the visible portion of the radiation spectrum as well as far into the infrared region and, hence, would appear to be a suitable host glass for rare earth metals. Nevertheless, rare earth dopants have been found to be relatively insoluble in arsenic sulfide glasses.

Rare earth dopants are known to be very soluble in most oxide glasses and their apparent insolubility in arsenic sulfide glasses has been conjectured to be due to the gross structural dissimilarity existing between the latter and oxide glasses. Arsenic sulfide glasses are believed to consist of long chains and layers of covalently bonded pyramidal $AsS_3$ groups, whereas oxide glasses typically comprise a three-dimensional network of relatively ionically bonded $MO_4$ tetrahedra, where M is a so-called network-forming metal such as silicon, phosphorus, aluminum, etc. Rare earth dopants are readily accommodated in these ionic network structures where they can compensate charge imbalances that arise from the presence of two or more network-forming metals, for example, aluminum and silicon in aluminosilicate glasses.

Commonly owned U.S. Pat. No. 5,392,376 discloses a system of sulfide glasses which exhibits good transparency in both the visible and infrared portions of the electromagnetic spectrum, and which possesses a relatively ionic three-dimensional structure, comprises gallium sulfide glasses. In contrast to arsenic sulfide glasses, the structure of these glasses is based upon a three-dimensional linkage of corner sharing $GaS_4$ tetrahedra. Rare earth metals are readily soluble in these glasses.

Binary AsP sulfide glasses have been described in the Journal of Non-Crystalline Solids in the articles "Vibrational Spectra and Structure of As—P—S Glasses" and "A Glass-Forming System With Compound-Forming Tendency: $AS_4S_6$—$P_4S_{10}$". However, the glasses described in the articles are Ga-free.

Commonly owned U.S. Pat. No. 6,277,775 describes Ge-rich GeAs sulfide glasses containing $P_2S_5$ and optionally $Ga_2S_3$ or $In_2S_3$ as useful host glasses in which rare earth dopants can also be efficiently dispersed.

It would be advantageous to have additional Ga—P—S glass compositions which are transparent in the infrared portion of the electromagnetic spectrum and which can be effectively doped with rare earth metals. Also, it would be advantageous to have Ga—P—S glass compositions which are also transparent into the visible portion of the electromagnetic spectrum having increased durability.

SUMMARY

One embodiment of the invention is a glass composition comprising, in atomic percent:
- 45 to 85 percent of S or of a combination of S and Se or a combination of S and Te or a combination of S, Se, and Te, wherein the percent of S is greater than or equal to the percent of Se, Te, or the combination of Se and Te;
- greater than 0 to 25 percent of Ga or of a combination of Ga and In, wherein the percent of In is less than or equal to 20 percent;
- greater than 0 to 20 percent P;
- 0 to 40 percent As;
- 0 to 15 percent Ge;
- 0 to 10 percent Sb; and
- 0 to 5 percent M, wherein M is selected from Sn, Tl, Pb, Bi and a combination thereof;
- wherein each percent is based on the total of S, Se, Te, Ga, In, P, As, Ge, Sb, and M atoms in the glass composition.

It has been surprisingly found that, whereas Ga has a low solubility in As-rich sulfide glasses, the combined addition of both Ga and P results in extensive glass formation in the ternary system $As_2S_3$—$Ga_2S_3$—$P_2S_5$. Moreover, glass formation in this system is sufficiently extensive that binary $Ga_2S_3$—$P_2S_5$ glasses can be formed. Using such compositions as a base glass, it has also been possible to demonstrate a continuous field of glass formation in the ternary $GeS_2$—$Ga_2S_3$-$P_2S_5$ system.

Such glass compositions address one or more of the above-mentioned disadvantages of conventional glass compositions and provide one or more of the following advantages: glasses with increased thermal stability and greater flexibility in tailoring other glass properties, for example, characteristic temperatures such as glass transition temperature (Tg), softening point, strain point, annealing point, etc, and coefficient of thermal expansion (CTE), and refractive index that may be important for specific applications.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawing figures.

DETAILED DESCRIPTION

Figure 1:
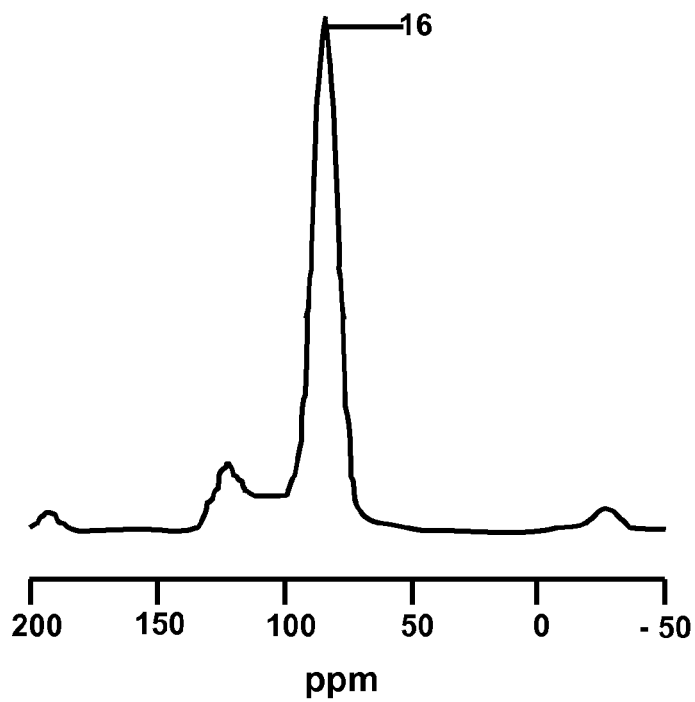
FIG. 1 is a solid-state $^{31}$P magic-angle spinning nuclear magnetic resonance ($^{31}$P MAS NMR) spectrum of a glass composition according to one embodiment.

Reference will now be made in detail to various embodiments of the invention. Wherever possible, the same reference numbers will be used throughout the drawings to refer to the same or like features.

One embodiment of the invention is a glass composition comprising, in atomic percent:

- 45 to 85 percent of S or of a combination of S and Se or a combination of S and Te or a combination of S, Se, and Te, wherein the percent of S is greater than or equal to the percent of Se, Te, or the combination of Se and Te;
- greater than 0 to 25 percent of Ga or of a combination of Ga and In, wherein the percent of In is less than or equal to 20 percent;
- greater than 0 to 20 percent P;
- 0 to 40 percent As;
- 0 to 15 percent Ge;
- 0 to 10 percent Sb; and
- 0 to 5 percent M, wherein M is selected from Sn, Tl, Pb, Bi and a combination thereof;
- wherein each percent is based on the total of S, Se, Te, Ga, In, P, As, Ge, Sb, and M atoms in the glass composition.

In some embodiments, the glass composition comprises greater than 0 percent As, greater than 0 percent Ge, greater than 0 percent Sb, and/or greater than 0 percent M.

Varying amounts, for example, a trace amount, 0.1, 0.2, 0.3, up to and including 10 percent of Sb can be present in the glass composition.

In one embodiment, the glass composition comprises greater than 0 percent M. Varying amounts, for example, a trace amount, 0.1, 0.2, 0.3, up to and including 5 percent of M can be present in the glass composition. The glass composition may therefore comprise, for example, greater than 0 percent Sn, greater than 0 percent Tl, greater than 0 percent Pb, and/or greater than 0 percent Bi.

The recited elements, and Sb and/or M in particular, can be used in varying amounts in order to alter one or more physical properties of the glass, for example, Tg, CTE, density, and/or absorption.

In one embodiment, the glass composition comprises the binary Ga$_2$S$_3$—P$_2$S$_5$ system, wherein one or more S atoms may be replaced by Se or Te; one or more Ga atoms may be replaced by In; and the combined total of S, Se, and Te atoms is from 70 percent to 130 percent of the stoichiometric value. The binary Ga$_2$S$_3$—P$_2$S$_5$ system, according to one embodiment, comprises 40 to 60 mol percent Ga$_2$S$_3$ and 40 to 60 mol percent P$_2$S$_5$, wherein one or more S atoms may be replaced by Se or Te; one or more Ga atoms may be replaced by In; and the combined total of S, Se, and Te atoms is from 70 percent to 130 percent of the stoichiometric value.

The glass composition, in another embodiment, comprises the ternary GeS$_2$—Ga$_2$S$_3$—P$_2$S$_5$ system, wherein one or more S atoms may be replaced by Se or Te; one or more Ga atoms may be replaced by In; and the combined total of S, Se, and Te atoms is from 70 percent to 130 percent of the stoichiometric value.

The ternary GeS$_2$—Ga$_2$S$_3$—P$_2$S$_5$ system can comprise, for example, 1 to 60 mol percent Ga$_2$S$_3$, 1 to 60 mol percent P$_2$S$_5$, and greater than 0 to 55 mol percent GeS$_2$, wherein one or more S atoms may be replaced by Se or Te; one or more Ga atoms may be replaced by In; and the combined total of S, Se, and Te atoms is from 70 percent to 130 percent of the stoichiometric value.

The glass composition, according to yet another embodiment, comprises the ternary As$_2$S$_3$—Ga$_2$S$_3$—P$_2$S$_5$ system, wherein one or more S atoms may be replaced by Se or Te; one or more Ga atoms may be replaced by In; and the combined total of S, Se, and Te atoms is from 70 percent to 130 percent of the stoichiometric value.

The ternary As$_2$S$_3$—Ga$_2$S$_3$—P$_2$S$_5$ system can comprise, for example, 1 to 60 mol percent Ga$_2$S$_3$, 1 to 60 mol percent P$_2$S$_5$, and greater than 0 to 95 mol percent As$_2$S$_3$, wherein one or more S atoms may be replaced by Se or Te; one or more Ga atoms may be replaced by In; and the combined total of S, Se, and Te atoms is from 70 percent to 130 percent of the stoichiometric value.

According to some embodiments, the glass composition further comprises one or more lanthanide elements. Each lanthanide element in the composition can, independently, be present in an amount up to 5 atomic percent based on the total atoms in the glass composition, including the one or more lanthanide elements. Varying amounts, for example, a trace amount, 0.1, 0.2, 0.3, up to and including 5 atomic percent of one or more lanthanide elements can be present in the glass composition. Lanthanide elements are for example, lanthanum, cerium, praseodymium, neodymium, promethium, samarium, europium, gadolinium, terbium, dysprosium, holmium, erbium, thulium, ytterbium, and lutetium.

Various subsets of the glass compositions described above form additional embodiments of the invention. For instance, in one subset, the glass composition comprises in atomic percent:

- 60 to 70 percent of S or of a combination of S and Se or a combination of S and Te or a combination of S, Se, and Te;
- 6 to 20 percent Ga or a combination of Ga and In; and
- 15 to 20 percent P.

Such a glass composition can comprise, for example, greater than 0 to 15 percent In.

In a second subset, the glass composition comprises in atomic percent:

- 60 to 70 percent of S or of a combination of S and Se or a combination of S and Te or a combination of S, Se, and Te;
- 1 to 16 percent Ga or a combination of Ga and In;
- 1 to 17 percent P; and
- 4 to 40 percent As.

In a third subset, the glass composition comprises in atomic percent:

60 to 70 percent of S or of a combination of S and Se or a combination of S and Te or a combination of S, Se, and Te;
10 to 20 percent Ga or a combination of Ga and In;
10 to 20 percent P; and
1 to 15 percent Ge.

The glass compositions described herein can have, for example, a glass transition temperature of 150° C. or more. The glass transition temperature can also be, for example, 450° C. or less. The glass can also be transparent in the near infrared portion of the electromagnetic spectrum. The glasses can be transparent into the visible portion of the electromagnetic spectrum, for example, in the longer wavelength range of the visible spectrum.

The wide glass forming region of glasses comprising Ga and P embraced by the invention provides for flexibility in tailoring glass properties, for example, characteristic temperatures such as Tg, softening point, strain point, annealing point, etc, and CTE, and refractive index that may be important for specific applications.

The combined presence of Ga and P in the glasses results in the formation of $GaPS_4$-like structural units as shown in FIG. 1 by the $^{31}P$ MAS NMR spectrum of $GaPS_4$ glass, in this example, example composition 1 shown in Table 1. The resonance 16 at 84 ppm is associated with $PS_{4/2}$ groups in the glass.

These $GaPS_4$-like structural units provide improved durability as compared to that of P-containing, but Ga-free, sulfide glasses. In Ga-free P-containing sulfide glasses, P is typically present as tetrahedral $S=PS_{3/2}$ groups in which one of the 4 coordinating S atoms is non-bonding and, hence, relatively reactive. As a consequence, such materials often have poor humidity resistance. The presence of Ga converts the latter into tetrahedral $PS_{4/2}$ groups in which all 4 coordinating S atoms form a bond between P and an adjacent Ga atom, resulting in a more chemically resistant network. When the ratio of Ga to P is 1 or greater, all non-bonding S atoms on P are compensated by Ga, thus maximizing durability. In one embodiment, the glass composition has a Ga/P ratio of 0.8 or more, for example greater than or equal to one.

Figure 2:
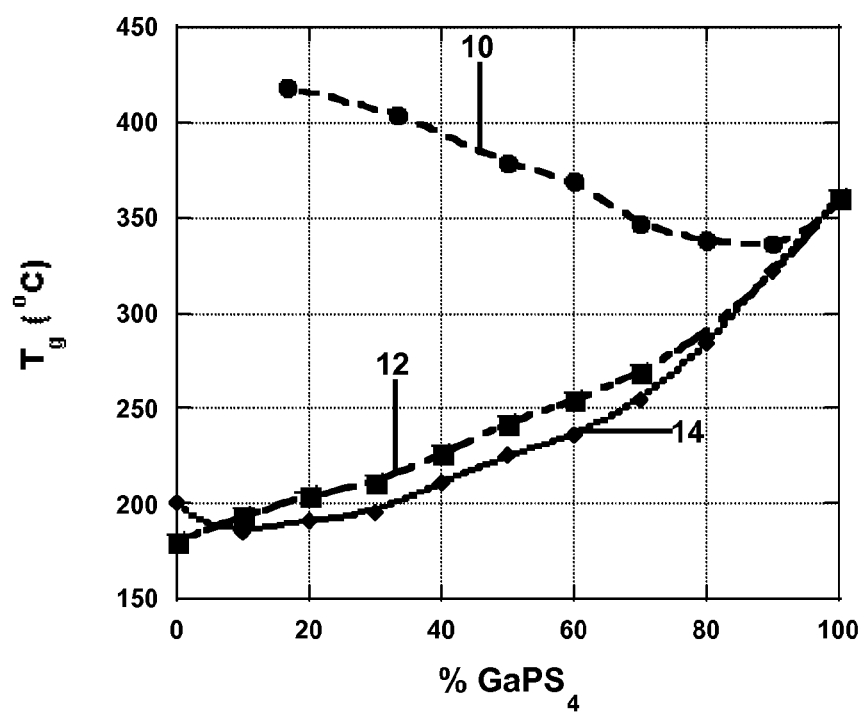
FIG. 2 is a graph showing Tg versus mol percent GaPS$_4$ for exemplary glass compositions.

FIG. 2 is a graph showing Tg versus exemplary glass compositions, for example, line 10 shows the Tg for exemplary $GeS_2$—$GaPS_4$ glasses versus the percent $GaPS_4$ present in the glass composition, line 12 shows the Tg for exemplary $AsPS_4$—$GaPS_4$ glasses versus the percent $GaPS_4$ present in the glass composition, and line 14 shows the Tg for exemplary $As_2S_3$—$GaPS_4$ glasses versus the percent $GaPS_4$ present in the glass composition. Thus, fiber draw or extrusion temperatures, for example, can be tailored over a range of at least 200° C.

Figure 3:
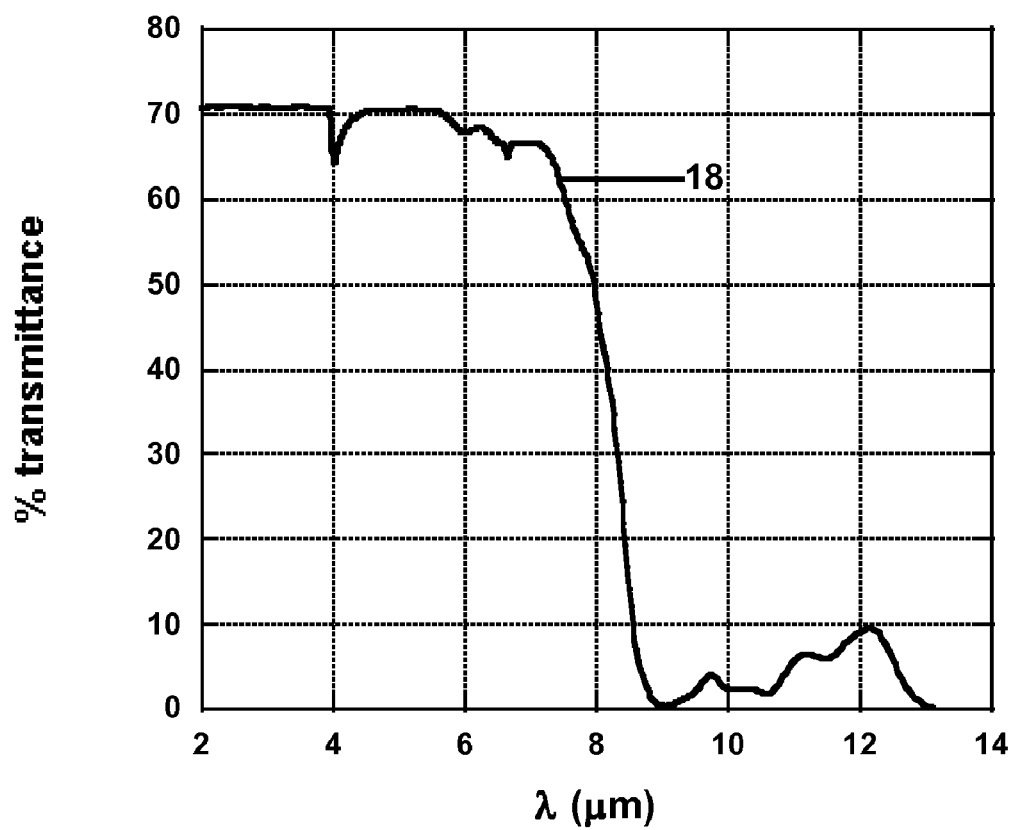
FIG. 3 is a graph showing the infrared transmission spectrum of a glass composition according to one embodiment.

In common with other sulfide glasses, the glass compositions described herein have an increased transparency in the infrared portion of the electromagnetic spectrum, as shown in FIG. 3. Line 18 shows the infrared transmission spectrum of the exemplary GaPAs sulfide glass, example 13, shown in Table 2. The thickness of the sample was 2 mm.

The reduced concentration or absence of $S=PS_{3/2}$ groups serves to reduce or eliminate the relative high frequency absorption due to P=S stretching.

EXAMPLES

Glass compositions, according to the invention, can be prepared using conventional sulfide glass melting and forming methods known by those skilled in the art. For instance, with respect to the exemplary glass compositions of the following examples, from 10 gram to 36 gram batches of elements, for example, Ga, P, As, Ge, and S were loaded into fused silica ampoules in a nitrogen-filled glovebox. The ampoules were evacuated to approximately $10^{-6}$ Torr, flame sealed and then heated to approximately 800° C. in a rocking furnace. After melting, the ampoules were quenched in room temperature water to convert the sulfide melts to glass.

Exemplary compositions are shown by the examples in Table 1, Table 2, Table 3, Table 4, and Table 5. Each Table shows the actual batch weights, the glass compositions in atomic percent, and the glass compositions in mol percent.

Table 1 shows exemplary glass formation in the binary $Ga_2S_3$—$P_2S_5$ system as well as examples in which Ga is partially replaced by In. Table 2 and Table 3 show exemplary glass formation in the ternary $As_2S_3$—$Ga_2S_3$—$P_2S_5$ system, with glasses along the $As_2S_3$—$GaPS_4$ join shown in Table 2, and glasses along the $AsPS_4$—$GaPS_4$ join shown in Table 3. Table 4 shows ternary glasses from the ternary $GeS_2$—$Ga_2S_3$—$P_2S_5$ system. Table 5 shows exemplary nonstoichiometric glass formation in the binary $Ga_2S_3$—$P_2S_5$ system, in the ternary $GeS_2$—$Ga_2S_3$—$P_2S_5$ system and in the ternary $As_2S_3$—$Ga_2S_3$—$P_2S_5$ system. In Table 5, % xsS is the percentage of Sulfur in excess of normal stoichiometry when the glass comprises the components present in its respective column or 100 percent Sulfur for normal stoichiometry for that particular glass composition. For instance, example 31 in Table 5 shows −10 in the % xsS row. This glass composition has 100−10=90 percent Sulfur as compared to normal stoichiometry for that particular glass composition. For example 36 in Table 5 shows 10 in the % xsS row. This glass composition has 100+10=110 percent Sulfur as compared to normal stoichiometry for that particular glass composition.

$T_g$ was measured by differential scanning calorimetry (DSC) and softening point ($T_s$) was determined by parallel plate viscometry. The absorption edge ($\lambda_0$) was calculated from transmittance data as the wavelength at which the transmittance equaled 50% of the transmittance at 2.4 μm.

TABLE 1

| | Example | | | | | | | | |
|---|---|---|---|---|---|---|---|---|---|
| | 1 | 2 | 3 | 4 | 5 | 6 | 7 | 8 | 9 |
| Ga (gms) | 10.964 | 2.479 | 3.340 | 2.688 | 2.344 | 2.013 | 1.694 | 1.386 | 1.089 |
| P (gms) | 4.871 | 1.493 | 1.214 | 1.327 | 1.302 | 1.277 | 1.254 | 1.232 | 1.210 |
| In (gms) | | | | 0.492 | 0.965 | 1.421 | 1.860 | 2.283 | 2.691 |
| S (gms) | 20.166 | 5.758 | 5.446 | 5.493 | 5.389 | 5.289 | 5.192 | 5.099 | 5.009 |
| Ga (at %) | 16.67 | 14.75 | 18.64 | 15 | 13.33 | 11.67 | 10 | 8.33 | 6.67 |
| P (at %) | 16.67 | 18.03 | 15.25 | 16.67 | 16.67 | 16.67 | 16.67 | 16.67 | 16.67 |
| In (at %) | | | | 1.67 | 3.33 | 5 | 6.67 | 8.33 | 10 |
| S (at %) | 66.67 | 67.21 | 66.10 | 66.67 | 66.67 | 66.67 | 66.67 | 66.67 | 66.67 |

TABLE 1-continued

| | Example | | | | | | | | |
|---|---|---|---|---|---|---|---|---|---|
| | 1 | 2 | 3 | 4 | 5 | 6 | 7 | 8 | 9 |
| $Ga_2S_3$ (mol %) | 50 | 45 | 55 | 45 | 40 | 35 | 30 | 25 | 20 |
| $In_2S_3$ (mol %) | | | | 5 | 10 | 15 | 20 | 25 | 30 |
| $P_2S_5$ (mol %) | 50 | 55 | 45 | 50 | 50 | 50 | 50 | 50 | 50 |
| $T_g$ | ~360 | 330 | 404 | 361 | 355 | 355 | 357 | 350 | 343 |

TABLE 2

| | Example | | | | | | | | |
|---|---|---|---|---|---|---|---|---|---|
| | 10 | 11 | 12 | 13 | 14 | 15 | 16 | 17 | 18 |
| Ga (gms) | 1.027 | 2.069 | 3.126 | 4.197 | 5.285 | 6.387 | 7.506 | 8.642 | 9.794 |
| P (gms) | 0.456 | 0.919 | 1.389 | 1.865 | 2.348 | 2.838 | 3.335 | 3.839 | 4.351 |
| As (gms) | 19.872 | 17.788 | 15.675 | 13.532 | 11.358 | 9.152 | 6.914 | 4.643 | 2.238 |
| S (gms) | 14.645 | 15.224 | 15.811 | 16.406 | 17.010 | 17.623 | 18.245 | 18.876 | 19.516 |
| Ga (at %) | 1.96 | 3.85 | 5.66 | 7.41 | 9.09 | 10.71 | 12.28 | 13.79 | 15.25 |
| P (at %) | 1.96 | 3.85 | 5.66 | 7.41 | 9.09 | 10.71 | 12.28 | 13.79 | 15.25 |
| As (at %) | 35.29 | 30.77 | 26.42 | 22.22 | 18.18 | 14.29 | 10.53 | 6.90 | 3.39 |
| S (at %) | 60.78 | 61.54 | 62.26 | 62.96 | 63.64 | 64.29 | 64.91 | 65.52 | 66.10 |
| $Ga_2S_3$ (mol %) | 5 | 10 | 15 | 20 | 25 | 30 | 35 | 40 | 45 |
| $As_2S_3$ (mol %) | 90 | 80 | 70 | 60 | 50 | 40 | 30 | 20 | 10 |
| $P_2S_5$ (mol %) | 5 | 10 | 15 | 20 | 25 | 30 | 35 | 40 | 45 |
| $T_g$ | 185 | 191 | 195 | 211 | 225 | 236 | 254 | 284 | 322 |
| $T_s$ | 253 | 260 | 272 | | | | | | |
| $\lambda_0$ | 630 | 622 | 617 | 650 | 661 | | | | |

TABLE 3

| | Example | | | | | | |
|---|---|---|---|---|---|---|---|
| | 19 | 20 | 21 | 22 | 23 | 24 | 25 |
| Ga (gms) | 1.074 | 2.154 | 3.238 | 4.326 | 5.420 | 6.519 | 7.623 |
| P (gms) | 4.773 | 4.784 | 4.794 | 4.805 | 4.816 | 4.827 | 4.838 |
| As (gms) | 10.391 | 9.257 | 8.118 | 6.974 | 5.825 | 4.670 | 3.511 |
| S (gms) | 19.762 | 19.806 | 19.850 | 19.895 | 19.939 | 19.984 | 20.029 |
| Ga (at %) | 1.67 | 3.33 | 5 | 6.67 | 8.33 | 10 | 11.67 |
| P (at %) | 16.67 | 16.67 | 16.67 | 16.67 | 16.67 | 16.67 | 16.67 |
| As (at %) | 15 | 13.33 | 11.67 | 10 | 8.33 | 6.67 | 5 |
| S (at %) | 66.67 | 66.67 | 66.67 | 66.67 | 66.67 | 66.67 | 66.67 |
| $Ga_2S_3$ (mol %) | 5 | 10 | 15 | 20 | 25 | 30 | 35 |
| $As_2S_3$ (mol %) | 45 | 40 | 35 | 30 | 25 | 20 | 15 |
| $P_2S_5$ (mol %) | 50 | 50 | 50 | 50 | 50 | 50 | 50 |
| $T_g$ | 193 | 204 | 211 | 226 | 242 | 254 | 269 |

TABLE 4

| | Example | | | | |
|---|---|---|---|---|---|
| | 26 | 27 | 28 | 29 | 30 |
| Ga (gms) | 6.864 | 7.842 | 8.729 | 9.539 | 10.281 |
| P (gms) | 3.050 | 3.484 | 3.878 | 4.238 | 4.568 |
| Ge (gms) | 7.147 | 5.443 | 3.895 | 2.483 | 1.189 |
| S (gms) | 18.939 | 19.232 | 19.497 | 19.740 | 19.962 |
| Ga (at %) | 11.11 | 12.5 | 13.75 | 14.81 | 15.79 |
| P (at %) | 11.11 | 12.5 | 13.75 | 14.81 | 15.79 |
| Ge (at %) | 11.11 | 8.33 | 5.88 | 3.70 | 1.75 |
| S (at %) | 66.67 | 66.67 | 66.67 | 66.67 | 66.67 |
| $GeS_2$ (mol %) | 50 | 40 | 30 | 20 | 10 |
| $Ga_2S_3$ (mol %) | 25 | 30 | 35 | 40 | 45 |
| $P_2S_5$ (mol %) | 25 | 30 | 35 | 40 | 45 |
| $T_g$ | 379 | 369 | 347 | 338 | 336 |

TABLE 5

| | Example | | | | | |
|---|---|---|---|---|---|---|
| | 31 | 32 | 33 | 34 | 35 | 36 |
| Ge (gms) | — | — | 1.144 | 1.026 | — | — |
| As (gms) | — | — | — | — | 3.311 | 3.013 |
| Ga (gms) | 3.226 | 2.884 | 2.564 | 2.300 | 1.541 | 1.402 |
| P (gms) | 1.423 | 1.281 | 1.139 | 1.022 | 0.684 | 0.623 |
| S (gms) | 5.341 | 5.835 | 5.153 | 5.651 | 4.463 | 4.963 |
| Ge (at %) | — | — | 6.30 | 5.51 | — | — |
| As (at %) | — | — | — | — | 19.42 | 17.10 |
| Ga (at %) | 17.86 | 15.63 | 14.71 | 12.87 | 9.71 | 8.55 |
| P (at %) | 17.86 | 15.63 | 14.71 | 12.87 | 9.71 | 8.55 |
| S (at %) | 64.29 | 68.75 | 64.29 | 68.75 | 61.17 | 65.81 |
| $GeS_2$ (mol %) | — | — | 30 | 30 | — | — |
| $As_2S_3$ (mol %) | — | — | — | — | 50 | 50 |
| $Ga_2S_3$ (mol %) | 50 | 50 | 35 | 35 | 25 | 25 |
| $P_2S_5$ (mol %) | 50 | 50 | 35 | 35 | 25 | 25 |
| % xsS | −10 | 10 | −10 | 10 | −10 | 10 |
| $T_g$ | 402 | 327 | 401 | 338 | 225 | 197 |

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A glass composition comprising, in atomic percent:
   45 to 85 percent of S or of a combination of S and Se or a combination of S and Te or a combination of S, Se, and Te, wherein the percent of S is greater than or equal to the percent of Se, Te, or the combination of Se and Te;
   greater than 0 to 25 percent of Ga or of a combination of Ga and In, wherein the percent of In is less than or equal to 20 percent;
   greater than 0 to 20 percent P;
   0 to 40 percent As;
   0 to 15 percent Ge;
   0 to 10 percent Sb; and
   0 to 5 percent M, wherein M is selected from Sn, Tl, Pb, Bi and a combination thereof;
   wherein each percent is based on the total of S, Se, Te, Ga, In, P, As, Ge, Sb, and M atoms in the glass composition.

2. The glass composition according to claim 1, comprising greater than 0 percent As.

3. The glass composition according to claim 1, comprising greater than 0 percent Ge.

4. The glass composition according to claim 1, comprising greater than 0 percent Sb.

5. The glass composition according to claim 1, comprising greater than 0 percent M.

6. The glass composition according to claim 1, which comprises the binary $Ga_2S_3$—$P_2S_5$ system, wherein
   one or more S atoms may be replaced by Se or Te;
   one or more Ga atoms may be replaced by In; and
   the combined total of S, Se, and Te atoms is from 70 percent to 130 percent of the stoichiometric value.

7. The glass composition according to claim 6, wherein the binary $Ga_2S_3$—$P_2S_5$ system comprises 40 to 60 mol percent $Ga_2S_3$ and 40 to 60 mol percent $P_2S_5$, wherein
   one or more S atoms may be replaced by Se or Te;
   one or more Ga atoms may be replaced by In; and
   the combined total of S, Se, and Te atoms is from 70 percent to 130 percent of the stoichiometric value.

8. The glass composition according to claim 1, which comprises the ternary $GeS_2$—$Ga_2S_3$—$P_2S_5$ system, wherein
   one or more S atoms may be replaced by Se or Te;
   one or more Ga atoms may be replaced by In; and
   the combined total of S, Se, and Te atoms is from 70 percent to 130 percent of the stoichiometric value.

9. The glass composition according to claim 8, wherein the ternary $GeS_2$—$Ga_2S_3$—$P_2S_5$ system comprises 1 to 60 mol percent $Ga_2S_3$, 1 to 60 mol percent $P_2S_5$, and greater than 0 to 55 mol percent $GeS_2$, wherein one or more S atoms may be replaced by Se or Te; one or more Ga atoms may be replaced by In; and
   the combined total of S, Se, and Te atoms is from 70 percent to 130 percent of the stoichiometric value.

10. The glass composition according to claim 1, which comprises the ternary $As_2S_3$—$Ga_2S_3$—$P_2S_5$ system, wherein
    one or more S atoms may be replaced by Se or Te;
    one or more Ga atoms may be replaced by In; and
    the combined total of S, Se, and Te atoms is from 70 percent to 130 percent of the stoichiometric value.

11. The glass composition according to claim 10, wherein the ternary $As_2S_3$—$Ga_2S_3$—$P_2S_5$ system comprises 1 to 60 mol percent $Ga_2S_3$, 1 to 60 mol percent $P_2S_5$, and greater than 0 to 95 mol percent $As_2S_3$, wherein one or more S atoms may be replaced by Se or Te; one or more Ga atoms may be replaced by In; and
    the combined total of S, Se, and Te atoms is from 70 percent to 130 percent of the stoichiometric value.

12. The glass composition according to claim 1, further comprising one or more lanthanide elements.

13. The glass composition according to claim 12, wherein each lanthanide element in the composition is, independently, present in an amount up to 5 atomic percent based on the total atoms in the glass composition.

14. The glass composition according to claim 1, comprising in atomic percent:
    60 to 70 percent of S or of a combination of S and Se or a combination of S and Te or a combination of S, Se, and Te;
    6 to 20 percent Ga or a combination of Ga and In; and
    to 20 percent P.

15. The glass composition according to claim 14, comprising in atomic percent:
    greater than 0 to 15 percent In.

16. The glass composition according to claim 1, comprising in atomic percent:
    60 to 70 percent of S or of a combination of S and Se or a combination of S and Te or a combination of S, Se, and Te;
    1 to 16 percent Ga or a combination of Ga and In;
    1 to 17 percent P; and
    4 to 40 percent As.

17. The glass composition according to claim 1, comprising in atomic percent:
    60 to 70 percent of S or of a combination of S and Se or a combination of S and Te or a combination of S, Se, and Te;
    10 to 20 percent Ga or a combination of Ga and In;
    10 to 20 percent P; and
    1 to 15 percent Ge.

18. The glass composition according to claim 1, wherein the glass transition temperature is 150° C. or more.

19. The glass composition according to claim 1, wherein the glass transition temperature is 450° C. or less.

20. The glass composition according to claim 1, wherein the glass is transparent in the near infrared portion of the electromagnetic spectrum.

21. The glass composition according to claim 1, wherein the glass is transparent into the visible portion of the electromagnetic spectrum.

22. The glass composition according to claim 1, wherein the glass composition has a Ga/P ratio of 0.8 or more.

* * * * *